US005939172A

United States Patent [19]

Snakenborg et al.

[11] Patent Number: 5,939,172

[45] Date of Patent: Aug. 17, 1999

[54] METALLIC SCREEN MATERIAL HAVING A STRAND OR FIBRE STRUCTURE, AND METHOD FOR MANUFACTURING SUCH A MATERIAL

[75] Inventors: Johannes T. Snakenborg, Dieren; Johannes Korsse, Apeldoorn, both of Netherlands

[73] Assignee: Stork Screens B.V., Netherlands

[21] Appl. No.: 08/663,297

[22] PCT Filed: Dec. 16, 1994

[86] PCT No.: PCT/NL94/00321

§ 371 Date: Jun. 21, 1996

§ 102(e) Date: Jun. 21, 1996

[87] PCT Pub. No.: WO95/17534

PCT Pub. Date: Jun. 29, 1995

[30] Foreign Application Priority Data

Dec. 22, 1993 [NL] Netherlands ........................... 9302238

[51] Int. Cl.[6] ........................................ B32B 3/06

[52] U.S. Cl. ....................... 428/156; 148/518; 204/157.4; 205/95; 205/711; 442/7; 428/935

[58] Field of Search ................................ 442/7; 428/107, 428/113, 134, 137, 156, 935; 148/518; 204/157.4; 205/95, 711

[56] References Cited

U.S. PATENT DOCUMENTS

| | | |
|---|---|---|
| 3,759,799 | 9/1973 | Reinke . |
| 4,039,396 | 8/1977 | Anselrode . |
| 4,107,003 | 8/1978 | Anselrode . |

FOREIGN PATENT DOCUMENTS

| | | |
|---|---|---|
| 0 038 104 | 10/1981 | European Pat. Off. . |
| 0 492 731 | 7/1992 | European Pat. Off. . |
| 2225542 | 11/1974 | France . |
| 27 28 084 | 1/1978 | Germany . |
| 684 527 | 10/1994 | Switzerland . |
| 2 051 620 | 1/1981 | United Kingdom . |

*Primary Examiner*—Mary E. Ceperley
*Attorney, Agent, or Firm*—Deveau, Colton & Marquis

[57] ABSTRACT

A screen material is described which is formed by cladding, using electroplating, a structure composed of strands or fibers. The structure may incorporate a knit, woven or nonwoven material or, alternatively, of strands or fibres welded together, wound strands or fibers. The structure may be subjected to a calendering operation. The screen material, after having been provided, if required, with an electrically conductive cladding, is provided with a metal layer in an electroplating operation under conditions in which an overgrowth ratio R greater than 1 is achieved. The invention also describes a method for manufacturing such a screen material which preferably involves making use of an electroplating bath for depositing a metal cladding on a starting material in which a chemical compound is present which increases the overgrowth ratio R. The method can be implemented using a variety of conditions which can lead to an overgrowth ratio R of a desired value.

17 Claims, 1 Drawing Sheet

Figure 1:
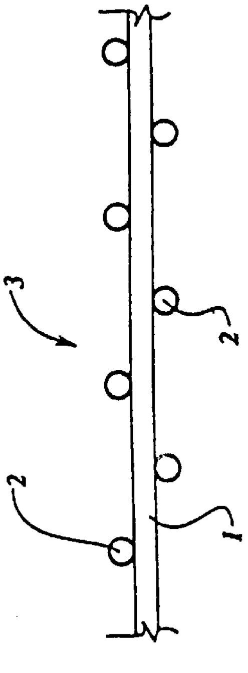

METALLIC SCREEN MATERIAL HAVING A STRAND OR FIBRE STRUCTURE, AND METHOD FOR MANUFACTURING SUCH A MATERIAL

The invention relates to a screen material composed of strands or fibres, in which the strands or fibres, at their surface, consist of metal which has been deposited it in an electroplating operation.

Such a screen material is known from the U.S. Pat. No. 1934643.

Said publication describes a woven strand gauze which preferably consists of metal wires which are linked to one another in the crossing points with the aid of an electroplating operation.

A gauze as described, whose strands or fibres are provided with a metal layer, by means of an electroplating operation, has the drawback that, owing to the metallic overgrowth, a considerable diminution of the size of the openings occurs, with an attendant reduced aperture and a greater chance of blockage of the screen material. Said screen material can be used, for example, for effecting a separation between a liquid and a solid contained therein; such a screen material can also be used in the screen-printing industry for printing substrates.

The object of the present invention is to provide a solution for the abovementioned drawback and, to this end, relates to a screen material of the type specified, in which the structure composed of strands or fibres has been chosen from a knit, a woven, a nonwoven material, a material from strands which have been welded together, a material obtained by winding strands, or versions, subjected to calendering, of the last-mentioned two material types, and the strands are formed from electro-conductive material or else are provided with an electro-conductive cladding, and the metal in the electroplating operation has been deposited with an overgrowth ratio R greater than 1.

The term "overgrowth ratio" in this case refers to the maximum total thickening by metal, encountered all around a strand, divided by the maximum total thickening with metal, measured in a direction perpendicular to the direction of the first measurement.

In normal electroplating processes, said overgrowth ratio will in general mainly be equal to 1; if the overgrowth ratio is distinctly greater than 1, this is described as preferential overgrowth, and values of, for example, greater than 1.5 can be achieved which, in general, can go up to 10 and more.

It is known in the prior art to manufacture screen materials entirely by means of electroplating, in which, for example, a metallic screen skeleton, electroformed on a matrix, is removed from the matrix and is then thickened in an electroplating bath which, in particular, contains a brightener which has properties of a second class brightener. By following such a method, an overgrowth is obtained which, in the main, takes place preferentially in a direction perpendicular to the plane of the screen skeleton. Said materials and a method therefor are described in the Applicant's European Patent EP-B-0038104.

The use of a structure composed of strands or fibres, instead of a screen skeleton, is not described in said publication, nor is it suggested. When a known method of this type was applied to screen materials which comprise a structure composed of strands or fibres, it was found, surprisingly, that the previously mentioned linkage, aimed for in the American publication, of strands at the crossing points is strongly promoted by the preferential overgrowth character of the metal deposit, as a result of which, on the one hand, a gauze can be obtained which, with respect to the original gauze, has a very large open area, while on the other hand, nevertheless (assuming that, for example, a direction of preferential overgrowth is chosen which is in the main perpendicular to the plane of the starting gauze material) an extraordinarily strong link between the strands or fibres in the crossing points is accomplished, as a result of which an exceedingly sturdy and dimensionally stable gauze is obtained.

With regard to the above-described screen materials according to the invention, it should be noted that the screen materials made of strands welded to another, the screen materials obtained by winding or the calendered versions of said materials form a category of materials which is not known in the prior art. These materials and a method for manufacturing them are the subject of an application filed simultaneously with the present application; the character of the materials in question will here be described briefly.

A screen material having welded strands refers to a material which is composed of a first set of mutually parallel and equidistant strands, and a second set of such strands. The directions of the two sets of strands form an angle with one another in such a way that a large number of quadrangled openings are left clear.

In the assembly thus arranged, the strands are linked together in the crossing points by welding, gluing, fusing etc., depending on the type of the strands which, for example, may be formed from metal or plastic.

A screen material which has been obtained by winding is to be understood as follows. A roller has wire, for example made of metal or plastic, wound around it in such a way that the strands are contiguous. By welding, gluing or the like, the contiguous strands are linked locally. Then the material thus formed is deformed by stretching in a direction parallel to the axis of the cylinder, to form openings in order to obtain a screen material. Both the materials previously described schematically can, if required, be subjected to a calendering operation in order to obtain an essentially planar screen material. The materials described earlier can be cylindrically seamless or sheet-like.

The term calendering, incidentally, in the present application refers to subjecting a screen material to a rolling operation in order to enhance the flatness of the material in question.

Obviously, the previously discussed screen materials having a structure composed of a woven, knit or nonwoven material can likewise, before or after the electroplating operation, be subjected to calendering to provide the screen material with an essentially flat character; i.e. to remove protuberances in the plane of the screen material.

In particular, the metal deposited in the electroplating operation is nickel, and the overgrowth ratio R is from 1.5 to 10.

In an attractive embodiment, the screen material is a cylindrical screen material which, in the case of a knit, a material made of strands welded together, a material obtained by winding, or calendered versions of the last-mentioned two types of material, can be a seamless, cylindrical screen material, whereas in the case of a woven or a nonwoven material a welded seam may be present. The application also relates to a method for manufacturing a screen material. In said methods a suitable structure composed of strands or fibres, wherein at least the surface of said strands or fibres is electrically conductive, is subjected as such to an electroplating operation in an unsupported state, i.e. without contact with an eventual supporting substrate.

It is to be understood that for structures having not sufficient rigidity suitable tensioning means may be used to provide means of electrical contract with the structure and the required shape for electroplating purposes.

This method known from the abovementioned U.S. Pat. No. 1934643 and, as mentioned earlier, has the drawback that, on the one hand, a considerable reduction in the open area, with respect to the open area of the original gauze, may occur while, on the other hand, in the final product the strength of the metal covering of the crossing points of the strands or fibres increases by relatively little.

The object of the present application is to provide a method of the type specified which does not have the abovementioned drawbacks and, to this end, is characterized in that the electroplating operation is carried out employing an electroplating bath which comprises, in the bath fluid, at least one chemical compound which increases the overgrowth ratio R and is in the form of a brightener having properties of a second class brightener. As mentioned earlier, the use of an electroplating bath in which a specific chemical compound which increases the overgrow ratio R is present is known from the Applicant's European Patent EP-B-0038104; the use of this known method for manufacturing a screen material starting from a structure composed of strands or fibres is neither described nor suggested in said publication. As a result of the method as specified being carried out, starting from, for example, a woven, knit, nonwoven material, a material of strands welded together, a material obtained by winding, or calendered versions of the last-mentioned two types of materials, a material is obtained, on the one hand, whose aperture has decreased only slightly with respect to the starting material; on the other hand, as a result of the preferential character of the overgrowth, a very high degree of strengthening and linkage of the contact points of strands or fibres crossing one another is obtained, so that an extraordinarily strong material results which shows a high degree of stability with respect to deformation of the meshes.

In particular, the abovementioned method according to the invention can be carried out using one or more conditions. The first type of condition implies that during the operation of electro-depositing metal, a flow of bath fluid through the openings of the structure composed of strands or fibres is maintained with a velocity of at least 0.005 m/sec. Such a condition is known per se from the European Patent EP-B-0049022.

In the said patent, a method is described in which a perforated material such as a screen skeleton is thickened in an electrolytic bath in which it has been placed as a cathode, a flow being maintained in the electrolytic bath through the perforations of the cathode in the direction of the anode, while a compound which has properties of a second class brightener is present in the bath. In that case, a preferential overgrowth is observed which, given the character of the flow, preferentially extends in the direction of the anode and in the main is perpendicular to the plane of the screen skeleton which has been connected as the cathode.

If the flow direction deviates from the direction of the normal between the anode and the cathode, a preferential direction is found which corresponds to said deviating direction. In said patent, the use, as a starting material, of a structure composed of strands or fibres is neither indicated nor suggested.

In another embodiment of the previously indicated method, the latter is carried out under the conditions in which, during the deposition of metal on the starting material, use is made of a pulsating current, which comprises pulsed-current periods which are separated from zero-current periods, or comprises periods of current in the opposite direction, and the overgrowth ratio R is controlled with the aid of the pulse parameters of the pulsating current T and T', where T is the length of the pulsed-current period and T' is the length of the zero-current periods or periods of current in the opposite direction, and T and T' are set, independently of one another, to between 0 and 9900 msec. Such a method is known per se from the European Patent EP-B-0079642. Said publication again describes the thickening, with the aid of an electroplating method, of a base screen material under the influence of a pulsating current; the use of said known method for cladding with metal a screen material which comprises a structure composed of strands or fibres is neither described nor suggested.

The present method may obviously also use both the abovementioned measures, i.e. a combination of a forced flow of bath fluid through the perforations of the starting screen material and the use of a pulsating current to control the overgrowth ratio. In all cases, however, the bath fluid used for the electroplating method will contain a chemical compound which has properties of a second class brightener.

Concerning a general description of chemical compounds which have the properties of a second class brightener, reference should be made to Modern Electroplating, 3rd Edition, John Wiley & Sons; 1973, p. 296 ff. and in particular p.302ff.

With regard to the chemical compounds to be used, a choice can be made from the following types of compounds.

a. compounds having properties of a second class brightener, by which the internal stress of the final screen material is increased, compared to a screen material in whose manufacture such a brightener has not been used, b. a compound having properties of a second class brightener, by which the internal stress of the final screen material is decreased, compared to a screen material in whose manufacture such a brightener has not been used, c. a mixture of compounds as indicated under a. and b.

In particular, in the abovementioned method at least one brightener of the type a. indicated is used, chosen from:

organic aldehyde compounds such as formaldehyde, chlorine- or bromine-substituted aldehydes such as chloral hydrate, 1,2-benzopyrones such as coumarin, unsaturated carboxylic acids and their esters such as ortho-hydroxycinnamic acid and diethyl maleate, acetylene-type compounds such as 2-butyne-1,4-diol, nitrites such as ethylene cyanohydrin, compounds of quinoline, quinaldine and pyridine, such as N-methylquinoline iodide, aminopolyarylmethane compounds such as triphenylmethane dyes, azine, thiazine and oxazine dyes such as methylene blue, alkylene amines and polyamines such as tetraethylene pentamine, azo dyes such as p-amino-azobenzene.

If brighteners of type b. are employed, it is advantageous for such brighteners also to have properties of a first class brightener, for the definition of which reference should be made to the previously mentioned book Electroplating, 3rd Edition, John Wiley & Sons, 1973, p. 296 ff. and in particular p. 302 ff. Examples of such compounds are:

sulphonated heterocyclic compounds having unsaturation, sulphonated arylaldehydes, for example ortho-sulphobenzaldehyde, sulphonated allyl and vinyl compounds, for example allylsulphonic acid, sulphonated acetylenic compounds, for example 2-butyne-1,4-disulphonic acid and β-cyanoethyl thioether, thiourea and derivatives, for example allylthiourea and ortho-phenylenethiourea (2-mercaptobenzimidazole).

Very good performance of the compounds mentioned previously, having properties of a second class brightener together with properties of a first class brightener, is shown by organic compounds in the form of heterocyclic compounds having one or more N atoms, which contain sulphoalkyl, sulphoalkenyl, sulphoalkynyl, sulphoalkylaryl and sulphoarylalkyl groups, the alkyl, alkenyl, alkynyl, alkylaryl or arylalkyl group containing from 1 to 5 carbon atoms in the chain, such as sulphoalkylpyridine and pyrimidine compounds, for example:

1-(3-sulphopropyl)-pyridine and 1-(2-hydroxy-3-sulphopropyl)-pyrimidine.

Obviously, the compounds which can possibly be used within the scope of the invention are not limited to those mentioned previously and other compounds fitting within the wide scope of the options can likewise be used.

It may be advantageous to ensure the presence, in a bath which contains one or more of the abovementioned brighteners having properties of a second class brightener, of, in addition, one or more compounds exclusively having properties of a first class brightener. Such a presence may be advantageous in order to reduce the internal stress to a desired level, in the event of low concentration ot brighteners having properties of a second class brightener.

The abovementioned methods can be carried out on a starting material which, during the procedure, is maintained in a flat state; obviously, the method is also eminently suitable for carrying out the method starting from a cylindrical base material.

The product obtained with the aid of the method according to the invention can further be subjected to the customary secondary treatments such as a thermal treatment; for example a treatment at a temperature between 200 and 300° C. and in an inert gas atmosphere such as nitrogen over a period of from half an hour to two hours.

The product ultimately obtained can additionally be provided, by means of electroplating or in another way, with a wear-resistant top layer such as, for example, a top layer composed of chromium or tin-nickel or alternatively a top layer composed of a suitable ceramic material such as titanium nitride, silicon carbide, tungsten carbide, aluminium oxide and the like. The term "top layer" can in this case be understood as a layer present on all sides on the outer circumference of the strands of the screen material, as well as a layer which, measures suitable for this purpose being employed, is only applied, for example, to the top and bottom side of the plane of the screen material, those parts which bound the openings remaining free of such a wear layer.

The term "wear-resistant", incidentally, is also meant to include corrosion-resistant, so that coatings composed of suitable plastics, rubbers and resins can also be used.

The invention will now be described with reference to the figures, in which:

FIG. 1 indicates, schematically, a woven gauze material in section, and

Figure 2:
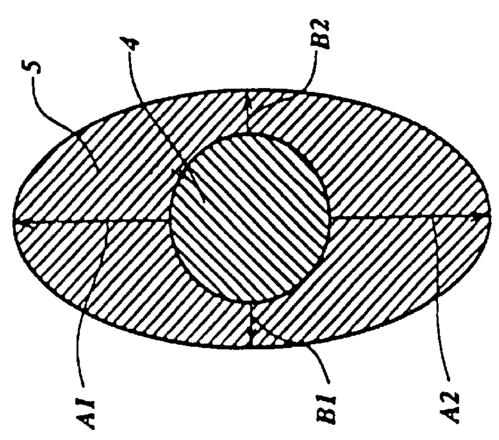
Figure 3:
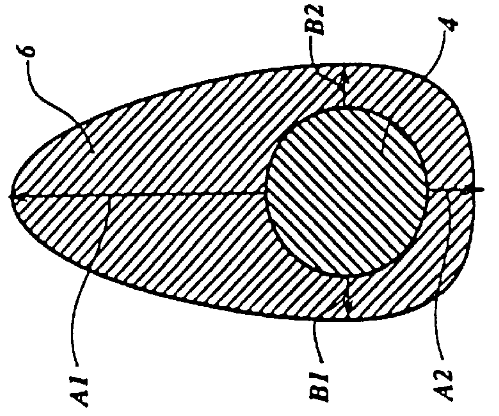
Figure 4:
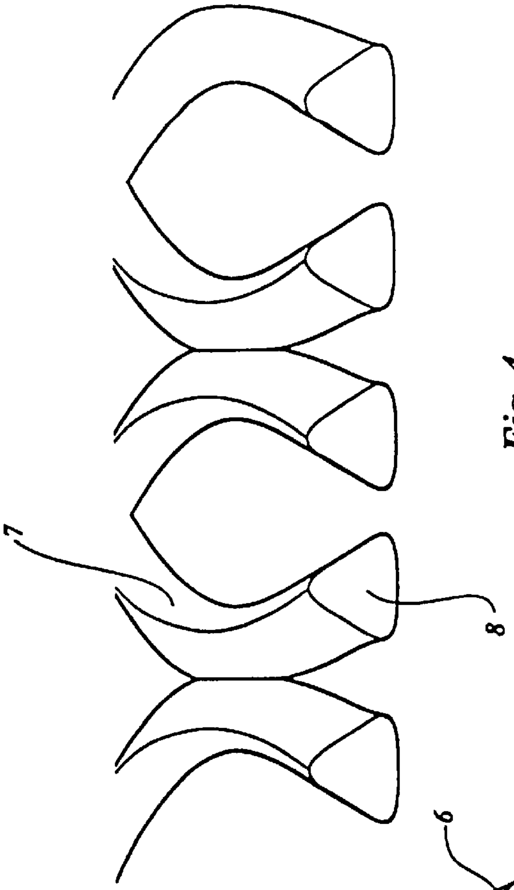
Figure 5:
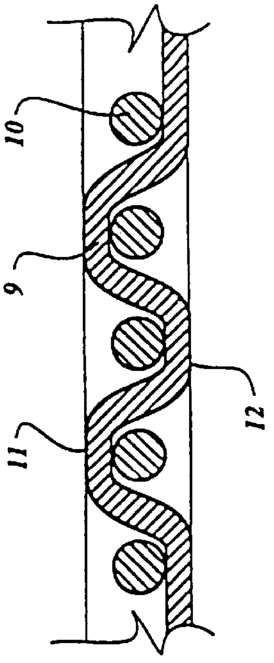

FIG. 2 schematically shows a strand thickened with metal in an electroplating procedure, FIG. 3 shows one thickened strand as in FIG. 2, with unilateral preferential overgrowth, FIG. 4 shows a structure, formed from strands welded together, in the unthickened state, FIG. 5 shows a calendered woven gauze in the unthickened state.

A gauze material in general consists of ends 1 and picks 2 which together provide the structure 3 composed of strands.

Instead of the woven structure as shown here, the structure 3 may also consist of a knit or a nonwoven structure or alternatively the previously mentioned structures may consist of strands linked together by welding, a structure made of wound wire or the calendered versions, respectively, of said materials.

The strands 1 and 2 can be formed from metal such as, for example, stainless steel, phosphor bronze and other suitable metals; alternatively, however, the strands may be plastic threads or filaments which, with the aid of suitable procedures, are provided with an electrically conductive layer. Such an electrically conductive layer may, for example, be applied in an electroless plating operation and will customarily consist of a thin copper or nickel layer. Alternatively it is obviously possible to apply a thin electrically conductive layer by means of other methods, for example with the aid of known vapour deposition or cathode sputtering procedures, physical vapour deposition (PVD) and chemical vapour deposition (CVD).

FIG. 2 shows, in section, a preferentially thickened strand 4, with 5 indicating a metallic cladding applied by electroplating.

The overgrowth ratio R mentioned earlier is given in the form of a formula as follows:

$$R=(A1+A2)/(B1+B2).$$

It will be evident that in FIG. 2 the R is considerably greater than 1 and typically is 6, for example. The strand 4 is here assumed to consist of stainless steel wire with a circular cross-section. The strand may obviously also consist of plastic, there being applied to the surface, with the aid of known methods, a thin electrically conductive layer.

FIG. 3 shows a strand preferentially thickened on one side, in which the overgrowth ratio is approximately also 6. In this case the overgrowth has been effected by establishing, during thickening, a liquid flow through the openings of the metal starting material 4 connected as the cathode.

FIG. 4 shows a perspective view of a screen material 7 which is formed from metal wires 8 having a triangular cross-section. For the purpose of production, the wires have been placed so as to be contiguous with one another, and have been locally linked by welding, gluing or fusing, after which the openings have been formed by stretching the material. This material can be thickened, with the aid of the method according to the invention, to give a preferential overgrowth with R>1. FIG. 5 finally shows a metal gauze which has been subjected to a calendering operation, prior to an electroplating operation being carried out. It can be seen that as a result of the calendering the wires have been flattened at 11 and 12. The flattened material thus formed is then thickened, according to the invention, in an electroplating bath in which a brightener is present in order to accomplish an overgrow ratio R>1.

The screen materials obtained in the method according to the invention excel by, on the one hand, their large open area compared to the starting material and, on the other hand, by a high strength of the links of strands crossing one another.

In particular, inter alia, by brighteners having a second class character being employed, an extraordinarily strong linking of strands crossing one another is obtained, which confers on the screen material obtained a high degree of strength and nondeformability of the meshes.

If forced bath fluid flow through the openings of the starting screen material is used and/or if a pulsating current is employed and/or special cathode-anode geometries are used, it is obviously possible to achieve a preferential overgrowth which can be tailored to the purpose for which the screen material is to be used. Thus it is possible, for example, using forced flow, to achieve a preferential overgrowth which has a preferential direction which is not perpendicular to the plane of the starting screen material, but forms an angle with said plane which differs from 90°. Those skilled in the art have at their disposal the above-described techniques for manufacturing a screen material, starting from a structure composed of strands or fibres, such as that of a woven, knit, nonwoven material or alternatively of strands or fibres welded together; wound strands or fibres, and which structure may have been subjected to a calendering operation, which screen material as an end product has the properties which are required of the material during use thereof.

The invention will now be illustrated by means of a non-limiting example.

EXAMPLE

A gauze made of phosphor bronze having a fineness of 200 mesh (40,000 openings per $inch^2$=6,200 openings per $cm^2$) was connected as the cathode in a nickel bath. The gauze had openings of 0.074×0.074 mm and an open area of 33.9%.

The wires of the gauze had a circular cross-section and a diameter of 50 micrometers. In a nickel bath which contained 160 mg/1 of 2-butyne-1,4-diol, there was deposited on the wires, measured in a direction perpendicular to the plane of the gauze, 25 μm of nickel. Measurements showed that the overgrowth ratio R was equal to 1.7. The open area of the finished material was determined as 22.3%. The gauze showed great strength and nondeformability of the meshes.

The screen material which is the subject of the invention will, depending on its application, be made available as a structure of flat, cylindrical or some other shape. For filtration purposes, it will be possible to deform the starting screen material to give a concertina structure, after which the preferential overgrowth process is performed. Other embodiments are likewise possible.

The screen material can be used not only for filtration purposes and printing purposes, but also as a support material for catalysts; a support material for accumulator plates; sound insulation material; decorative purposes etc.

We claim:

1. Screen material comprising a structure composed of individually distinguishable strands or fibres, in which the strands or fibres, at their surface, consist of metal which has been deposited in an electroplating operation employing an electroplating bath which comprises at least one chemical compound in the form of a brightener having properties of a second class brightener, and which metal strengthens the structure of strands or fibres in the points of contact between the strands or fibres, wherein the structure composed of strands or fibres has been chosen from a knit, a woven, a nonwoven material or alternatively from strands or fibres which have been welded together; wound strands or fibres, and which structures may have been subjected to a calendering operation, and the strands or fibres are formed from electroconductive material or else are provided with an electroconductive cladding, and the metal in the electroplating operation has been deposited with an overgrowth ratio R>1, whereby the overgrowth ratio is defined by the maximum total thickening by metal, encountered all around a strand or fibre and measured in a direction perpendicular to the plane of the structure, divided by the maximum total thickening with metal, measured in a direction perpendicular to the direction of the first measurement.

2. Screen material according to claim 1, wherein the metal deposited in the electroplating operation is nickel and the overgrowth ratio R is 1.5–10.

3. Screen material according to claim 1 wherein the screen material is a cylindrical screen material.

4. Method for manufacturing a screen material, comprising a structure composed of strands or fibres, in which the strands or fibres, at their surface, consist of metal which has been deposited in an electroplating operation, which metal strengthens the structure of the strands or fibres in the points of contact between the strands or fibres, wherein the electroplating operation is carried out employing an electroplating bath which comprises at least one chemical compound which increases the overgrowth ratio R and is in the form of a brightener having properties of a second class brightener.

5. Method according to claim 4, wherein the method is implemented employing one or more of the following conditions:

a) during at least part of the operation of electrode positing metal a flow of the bath fluid through the openings of the structure composed of strands or fibres is maintained with a velocity of at least 0.005 m/sec, b) during the deposition use is made of a pulsating current, which pulsed current comprises periods which are separated from zero-current periods, or comprises periods of current in the opposite direction, and the overgrowth ratio is controlled with the aid of the pulse parameters of the pulsating current T and T', where T is the length of the pulsed-current periods and T' is the length of the zero-current periods or periods of current in the opposite direction, and T and T' are set, independently of one another, to between 0 and 9900 msec.

6. Method according to claim 4 wherein the compound having properties of a second class brightener is chosen from:

a. compounds having properties of a second class brightener, by which the internal stress of the final screen material is increased, compared to a screen material in whose manufacture such a brightener has not been used, b. a compound having properties of a second class brightener, by which the internal stress of the final screen material is decreased, compared to a screen material in whose manufacture such a brightener has not been used, c. a mixture of compounds as indicated under a, and b.

7. Method according to claim 6, wherein at least one brightener of the type a) is used, selected from the group consisting of:

organic aldehyde compounds, chlorine- or bromine-substituted aldehydes, 1,2-benzopyrones, unsaturated carboxylic acids and their esters, acetylene-compounds, nitrites, compounds of quinoline, quinaldine and pyridine, aminopolyarylmethane compounds, azine, thiazine and oxazine dyes, alkylene amines and polyamines, and azo dyes.

8. Method according to claim 6, wherein at least one brightener of type b) is used which also has properties of a first class brightener, selected from the group consisting of:

sulphonated heterocyclic compounds having unsaturation, sulphonated arylaldehydes, sulphonated allyl and vinyl compounds, sulphonated acetylenic compounds, and thiourea and derivatives.

9. Method according to claim 8, wherein the brightener(s) is (are) selected from the group consisting of: heterocyclic compounds having one or more N atoms, which contain sulphoalkyl, sulphoalkenyl, sulphoalkynyl, sulphoalkylaryl or sulphoarylalkyl groups, the alkyl, alkenyl, alkynyl, alkylaryl or arylalkyl group containing from 1 to 5 carbon atoms in the chain.

10. Method according to claim 4, wherein the electroplating operation is carried out with the use of an electroplating bath which contains, in the bath fluid, a compound having properties of a first class brightener.

11. Method for manufacturing a screen material comprising a structure composed of strands or fibres, in which the strands or fibres are provided with an electrically conductive surface layer, wherein the structure is subjected to an electroplating operation for depositing metal on the strands or fibres, which metal strengthens the structure of the strands or fibres in the points of contact between the strands or fibres, the electroplating operation being carried out employing an electroplating bath, which bath comprises at least once chemical compound which increases the overgrowth ratio R and is in the form of a brightener having properties of a second class brightener.

12. Method according to claim 11, wherein the method is implemented employing one or more of the following conditions:

a) during at least part of the operation of electrode positing metal, a flow of the bath fluid through the openings of the structure composed of strands or fibres is maintained with a velocity of at least 0.005 m/sec, b) during the deposition use is made of a pulsating current, which pulsed current comprises periods which are separated from zero-current periods, or comprises periods of current in the opposite direction, and the overgrowth ratio is controlled with the aid of the pulse parameters of the pulsating current T and T', where T is the length of the pulsed-current periods and T' is the length of the zero-current periods or periods of current in the opposite direction, and T and T' are set, independently of one another, to between 0 and 9900 msec.

13. Method according to claim 11, wherein the compound having properties of a second class brightener is chosen from:

a. compounds having properties of a second class brightener, by which the internal stress of the final screen material is increased, compared to a screen material in whose manufacture such a brightener has not been used, b. a compound having properties of a second class brightener, by which the internal stress of the final screen material is decreased, compared to a screen material in whose manufacture such a brightener has not been used, c. a mixture of compounds as indicated under a and b.

14. Method according to claim 13, wherein at least one brightener of the type a) is used, selected from the group consisting of:

organic aldehyde compounds, chlorine- or bromine-substituted aldehydes, 1,2-benzopyrones, unsaturated carboxylic acids and their esters, acetylene-compounds, nitrites, compounds of quinoline, quinaldine and pyridine, aminopolyarylmethane compounds, azine, thiazine and oxazine dyes, alkylene amines and polyamines, and azo dyes.

15. Method according to claim 13, wherein at least one brightener of type b) is used which also has properties of a first class brightener, selected from the group consisting of:

sulphonated heterocyclic compounds having unsaturation, sulphonated arylaldehydes, sulphonated allyl and vinyl compounds, sulphonated acetylenic compounds, and thiourea and derivatives.

16. Method according to claim 8, wherein the brightener (s) is (are) selected from the group consisting of heterocyclic compounds having one or more N atoms, which contain sulphoalkyl, sulphoalkenyl, sulphoalkynyl, sulphoalkylaryl or sulphoarylalkyl groups, the alkyl, alkenyl, alkynyl, alkylaryl or arylalkyl group containing from 1 to 5 carbon atoms in the chain.

17. Method according to claim 11, wherein the electroplating operation is carried out with the use of an electroplating bath which contains, in the bath fluid, a compound having properties of a first class brightener.

* * * * *